US012113819B2

(12) United States Patent
Durvasula et al.

(10) Patent No.: US 12,113,819 B2
(45) Date of Patent: Oct. 8, 2024

(54) SYSTEMS AND METHODS FOR COLLECTING AND ANALYZING VIRTUAL DATA TO FIND CORRELATIONS BETWEEN EVENTS

(71) Applicant: MCKINSEY & COMPANY, INC., New York, NY (US)

(72) Inventors: Sastry Vsm Durvasula, Phoenix, AZ (US); Sonam Jha, Short Hills, NJ (US); Sriram Venkatesan, Princeton Junction, NJ (US); Anthony Esposito, South Orange, NJ (US); Rares Almasan, Paradise Valley, AZ (US)

(73) Assignee: MCKINSEY & COMPANY, INC., New York, NY (US)

( * ) Notice: Subject to any disclaimer, the term of this patent is extended or adjusted under 35 U.S.C. 154(b) by 0 days.

(21) Appl. No.: 18/078,722

(22) Filed: Dec. 9, 2022

(65) Prior Publication Data
US 2024/0195825 A1 Jun. 13, 2024

(51) Int. Cl.
*H04L 9/40* (2022.01)
(52) U.S. Cl.
CPC ...... *H04L 63/1425* (2013.01); *H04L 63/1416* (2013.01)
(58) Field of Classification Search
CPC .......... H04L 63/1425; H04L 63/1416
USPC .......................................................... 726/23
See application file for complete search history.

(56) References Cited

U.S. PATENT DOCUMENTS

| 10,409,988 | B2 * | 9/2019 | Reinecke | G06F 21/568 |
| 10,447,728 | B1 * | 10/2019 | Steinberg | H04L 63/10 |
| 10,664,070 | B2 | 5/2020 | Lipman et al. | |
| 11,514,173 | B2 | 11/2022 | McHugh et al. | |
| 2011/0004935 | A1 * | 1/2011 | Moffie | G06F 21/53 718/1 |
| 2011/0010675 | A1 * | 1/2011 | Hamilton | H04L 63/107 715/850 |
| 2012/0096352 | A1 * | 4/2012 | Maor | A63F 13/87 715/706 |
| 2015/0264053 | A1 * | 9/2015 | Shuster | G06F 3/04842 726/4 |

(Continued)

FOREIGN PATENT DOCUMENTS

GB 2593508 A 9/2021

OTHER PUBLICATIONS

Non-final Office Action, U.S. Appl. No. 18/078,750, mailed Apr. 25, 2023.

*Primary Examiner* — Badri Narayanan Champakesan
(74) *Attorney, Agent, or Firm* — MARSHALL, GERSTEIN & BORUN LLP

(57) ABSTRACT

The following relates generally to computer security, and more particularly relates to computer security in a virtual environment, such as a metaverse. In some embodiments, one or more processors: receive a set of known events (e.g., security threats) including event classifications; receive data of layers of the virtual environment; detect events in the data of the layers of the virtual environment; and determine correlations between the events in the data of the layers of the virtual environment. The correlations may be between events in different layers of the virtual environment. The one or more processors may also predict future events by analyzing the detected events.

16 Claims, 11 Drawing Sheets

(56) References Cited

U.S. PATENT DOCUMENTS

| | | | |
|---|---|---|---|
| 2016/0004863 A1* | 1/2016 | Lazri | G06F 21/554 |
| | | | 726/23 |
| 2020/0174979 A1 | 6/2020 | St. Martin et al. | |
| 2021/0178269 A1 | 6/2021 | Fear et al. | |
| 2022/0086179 A1* | 3/2022 | Levin | G06F 16/285 |
| 2022/0172076 A1 | 6/2022 | Kanza et al. | |
| 2022/0292543 A1* | 9/2022 | Henderson | G06Q 30/0252 |
| 2022/0303302 A1* | 9/2022 | Hwang | G06N 5/04 |
| 2023/0367444 A1* | 11/2023 | Yerli | H04L 67/131 |

* cited by examiner

300

| |
|---|
| 310 - Experience Layer |
| 320 - Discovery Layer |
| 330 - Creator Economy Layer |
| 340 - Spatial Computing Layer |
| 350 - Decentralization Layer |
| 360 - Human Interface Layer |
| 370 - Infrastructure Layer |
| 380 - Authentication, Authorization, And Integration Layer |
| 390 - Identity, And Access Management Layer |

| Event | | |
|---|---|---|
| Time | Classification | Layer |
| May 9, 2019; 12:12AM | Message pattern | Experience layer |
| September 1, 2020; 1:01PM | Message pattern | Discovery layer |
| September 3, 2020; 7:08 PM | Financial Fraud | Creator economy layer |
| September 7, 2020; 12:17 PM | Overlay | Spatial computing layer |

FIG. 10

| Event | | | Solution | |
|---|---|---|---|---|
| Time | Classification | Layer | Type | Effectiveness score |
| May 9, 2019; 12:12AM | Message pattern | Experience layer | Block messages | .77 |
| September 1, 2020; 1:01PM | Message pattern | Discovery layer | Add warning label to messages | .91 |
| September 3, 2020; 7:08 PM | Financial Fraud | Creator economy layer | Suspend user account | .45 |
| September 7, 2020; 12:17 PM | Overlay | Spatial computing layer | Permanently disable account | .53 |

1110 — INPUT (E.G. INDEPENDENT VARIABLES/EXPLANATORY VARIABLES)

1120 — OUTPUT (E.G. DEPENDENT VARIABLES/RESPONSE VARIABLES)

SYSTEMS AND METHODS FOR COLLECTING AND ANALYZING VIRTUAL DATA TO FIND CORRELATIONS BETWEEN EVENTS

FIELD

The present disclosure generally relates to computer security, and, more particularly, relates to computer security in a virtual environment, such as a metaverse.

BACKGROUND

The use of virtual environments, such as a metaverse, are increasing rapidly. In some examples, virtual environments are used for entertainment, such as video gaming. However, virtual environments are also used for other purposes as well, such as business and commerce.

Yet, virtual environments remain vulnerable to security threats, including traditional computer security threats, as well as new computer security threats specific to virtual environments.

The systems and methods disclosed herein provide solutions to this problem and others.

SUMMARY

The present disclosure relates broadly to computer security of a virtual environment. In some embodiments, the system may build a wealth of knowledge about the security of the virtual environment by analyzing virtual environment data to detect events (e.g., security threats, attacks, etc.). To further understand the security of the virtual environment, the system may correlate the detected events together. The correlations may be between events in the same virtual environment layer. However, the correlations may also be between events in different virtual environment layers. The correlations advantageously may be used to predict future events, and/or predict future types (e.g., classifications) of events that have never been seen before.

Furthermore, the system may determine one or more solutions to predicted future events. If more than one solution is determined, the system may rank the solutions. To this end, some embodiments use two different machine learning algorithms: an event machine learning algorithm, and a solution machine learning algorithm. The event machine learning algorithm may be trained, for example, to detect and/or classify events, determine new event classifications, determine trends in classifications of events, predict future events, etc. The solution machine learning algorithm may be trained to, for example, determine solutions, and/or rank solutions.

In one aspect, a computer-implemented method for improving security in a virtual environment by determining correlations between events in the virtual environment may be provided. The method may include: receiving, via or more processors, data of layers of the virtual environment, wherein the virtual environment is configured to allow a user to interact with a virtual world; detecting, via the one or more processors, events in the data of the layers of the virtual environment; and determining, via the one or more processors, correlations between the events in the data of the layers of the virtual environment, wherein at least one correlation of the determined correlations is between events of different layers in the virtual environment.

In another aspect, a computer system for improving security in a virtual environment by determining correlations between events in the virtual environment may be provided. The computer system may include one or more processors configured to: receive data of layers of the virtual environment, wherein the virtual environment is configured to allow a user to interact with a virtual world; detect events in the data of the layers of the virtual environment; and determine correlations between the events in the data of the layers of the virtual environment, wherein at least one correlation of the determined correlations is between events of different layers in the virtual environment.

In yet another aspect, a computing device for providing incentives or disincentives to an insured customer during the term of an insurance policy may be provided. The computing device may include: one or more processors; and one or more memories. The one or more memories may have stored thereon computer-executable instructions that, when executed by the one or more processors, cause the computing device to: receive data of layers of the virtual environment, wherein the virtual environment is configured to allow a user to interact with a virtual world; detect events in the data of the layers of the virtual environment; and determine correlations between the events in the data of the layers of the virtual environment, wherein at least one correlation of the determined correlations is between events of different layers in the virtual environment.

In another aspect, a computer-implemented method for improving security in a virtual environment by predicting a future event in the virtual environment may be provided. The method may include: receiving, via one or more processors, a set of known events including event classifications; receiving, via the or more processors, data of layers of the virtual environment, wherein the virtual environment is configured to allow a user to interact with a virtual world; detecting, via the one or more processors, events in the data of the layers of the virtual environment, wherein the detecting the events in the data comprises, via the one or more processors: (i) detecting the events according to the event classifications, and (ii) classifying the detected events into the event classifications; and predicting, via the one or more processors, the future event by analyzing the detected events.

In another aspect, a computer system for improving security in a virtual environment by predicting a future event in the virtual environment may be provided. The computer system may include one or more processors configured to: receive a set of known events including event classifications; receive data of layers of the virtual environment, wherein the virtual environment is configured to allow a user to interact with a virtual world; detect events in the data of the layers of the virtual environment, wherein the detecting the events in the data comprises, via the one or more processors: (i) detecting the events according to the event classifications, and (ii) classifying the detected events into the event classifications; and predict the future event by analyzing the detected events.

In yet another aspect, a computing device for improving security in a virtual environment by predicting a future event in the virtual environment may be provided. The computing device may include: one or more processors; and one or more memories. The one or more memories may have stored thereon computer-executable instructions that, when executed by the one or more processors, cause the computing device to: receive a set of known events including event classifications; receive data of layers of the virtual environment, wherein the virtual environment is configured to allow a user to interact with a virtual world; detect events in the data of the layers of the virtual environment, wherein the detecting the events in the data comprises, via the one or more processors: (i) detecting the events according to the event classifications, and (ii) classifying the detected events into the event classifications; and predict the future event by analyzing the detected events.

BRIEF DESCRIPTION OF THE DRAWINGS

FIG. 3 depicts example layers of an example virtual environment.

FIG. 10 illustrates an example table of historical event data.

FIG. 11 illustrates an example table of historical event data, and historical solution data.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

The following relates broadly to computer security of a virtual environment.

As used herein, the term virtual environment should be understood to refer to a virtual world, such as a metaverse, a virtual game world, an augmented-reality based virtual world, etc. As is understood in the art, in some examples, the virtual environment may be accessed by any computing device, such as a computer, a tablet, a smartphone or mobile device, a virtual reality (VR) headset, an augmented reality (AR) headset or glasses, smart glasses, smart watches, wearables, etc.

Example system

Figure 1:
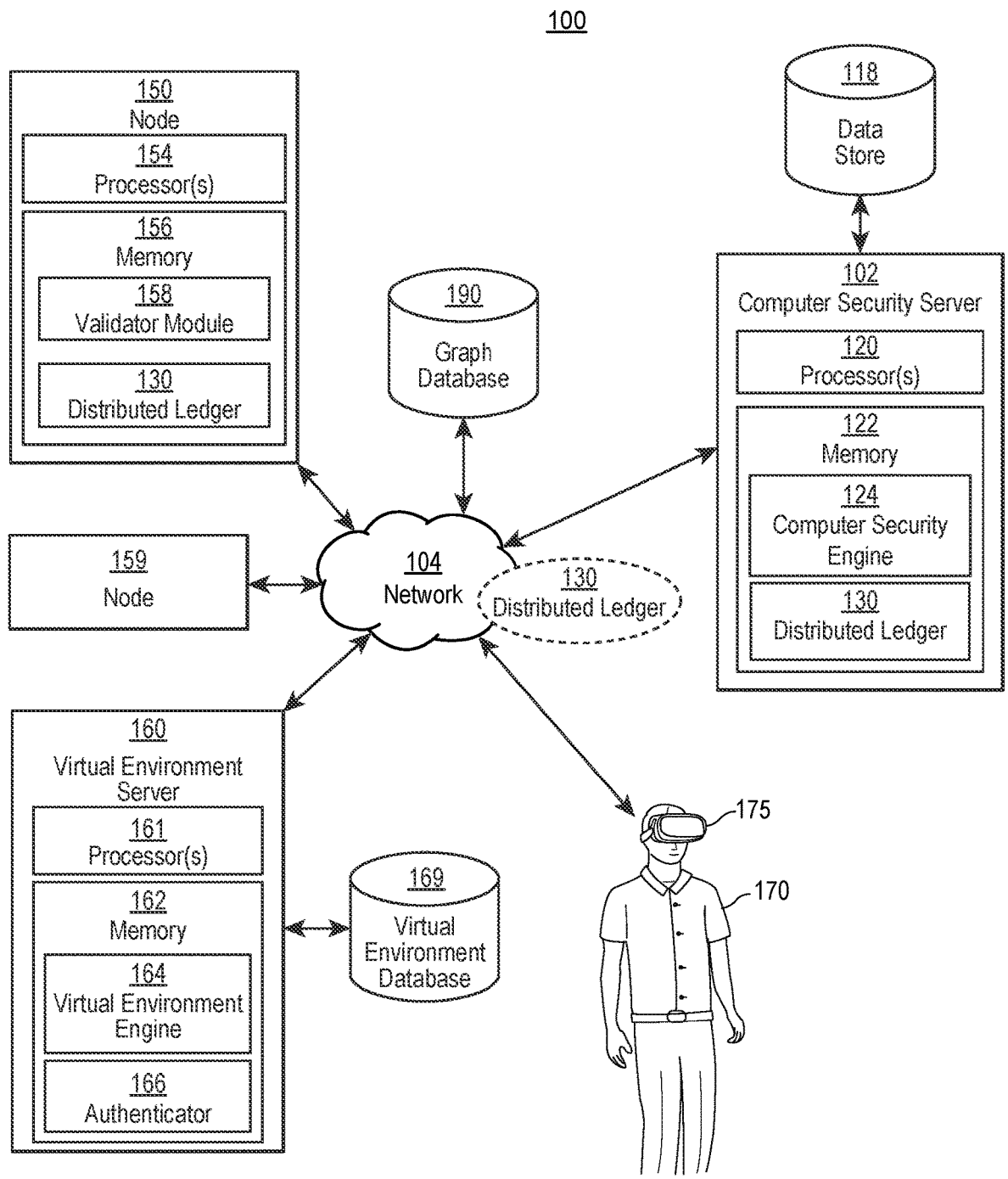
FIG. 1 depicts an exemplary computer system for providing computer security in a virtual environment, according to an embodiment.

FIG. 1 shows an exemplary computer system 100 for providing computer security in a virtual environment in which the exemplary computer-implemented methods described herein may be implemented. The high-level architecture includes both hardware and software applications, as well as various data communications channels for communicating data between the various hardware and software components.

Broadly speaking, a virtual environment, such as a metaverse, may be provided by the virtual environment server 160. The virtual environment may allow user-controlled characters (e.g., as represented by avatars in the virtual environment) to traverse the virtual world, interact with each other, gain experience, make purchases for real or virtual items, etc. As referred to herein, purchases refer to purchases made in traditional currency (e.g., U.S. dollars, Euros, etc.), cryptocurrency (e.g., Bitcoin, etc.), virtual currency (e.g., a currency used solely in the virtual world), and/or in exchange for other real or virtual items.

The virtual environment server 160 may include one or more processors 161 such as one or more microprocessors, controllers, and/or any other suitable type of processor. The virtual environment server 160 may further include a memory 162 (e.g., volatile memory, non-volatile memory) accessible by the one or more processors 161, (e.g., via a memory controller). The one or more processors 161 may interact with the memory 162 to obtain and execute, for example, computer-readable instructions stored in the memory 162. Additionally or alternatively, computer-readable instructions may be stored on one or more removable media (e.g., a compact disc, a digital versatile disc, removable flash memory, etc.) that may be coupled to the virtual environment server 160 to provide access to the computer-readable instructions stored thereon. In particular, the computer-readable instructions stored on the memory 162 may include instructions for executing various applications, such as virtual environment engine 164, and/or an authenticator 166.

In operation, the virtual environment engine 164 may provide the virtual environment. For example, as described elsewhere herein, the virtual environment engine 164 may provide the virtual environment to users such that characters may travel through the virtual environment, interact with each other, gain experience, make purchases, etc.

For instance, a user 170 may wish to participate in the virtual environment. To do so, the user 170 may use a user device 175 (e.g., a virtual reality (VR) headset, a computer, a tablet, a smartphone, an augmented reality (AR) headset, a server, etc.) to access the virtual environment. In this way, the user 170 may create a character to interact with the virtual environment.

Figure 2:
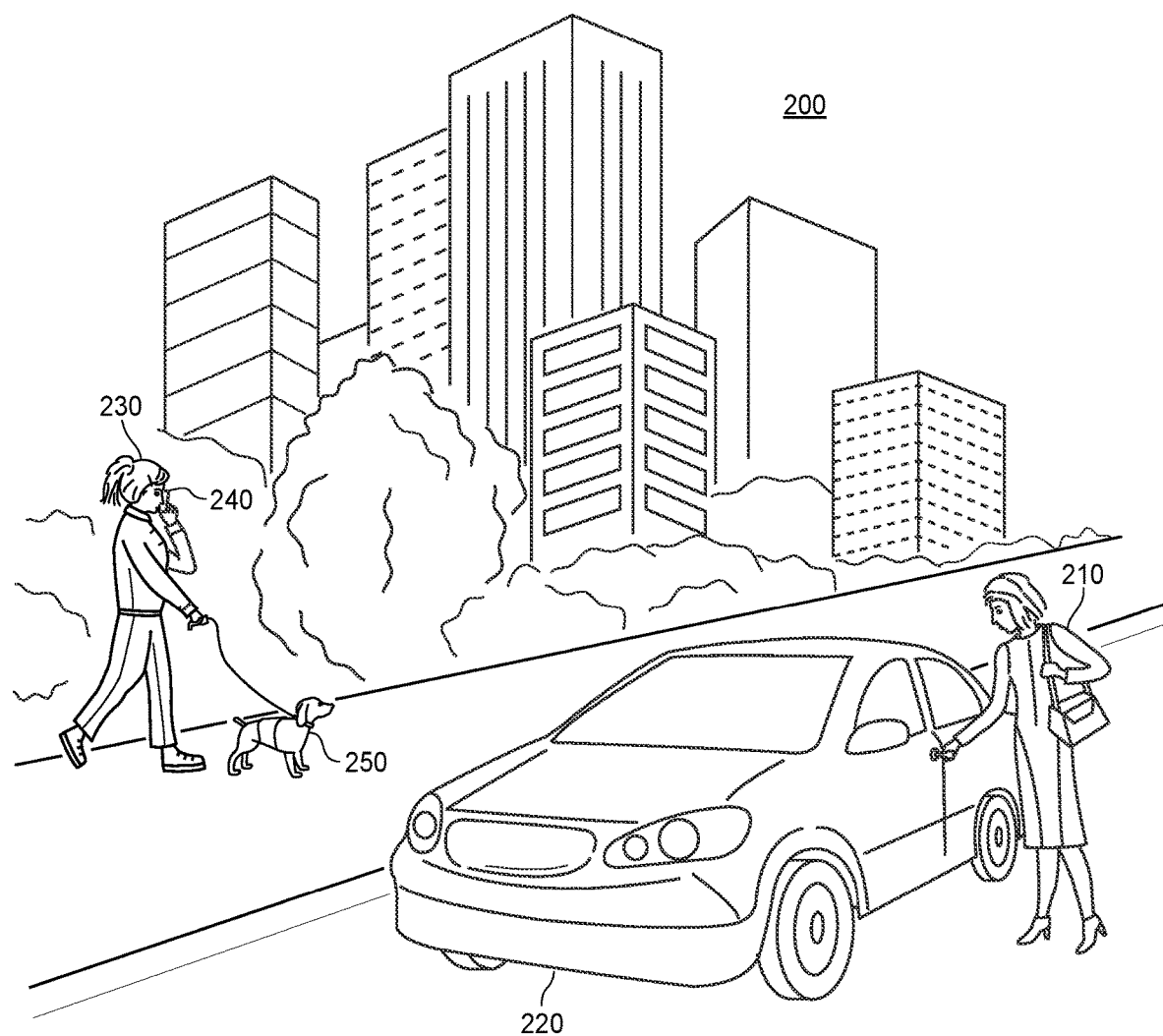
FIG. 2 depicts an example virtual environment.

To this end, FIG. 2 illustrates an example virtual environment 200. In the illustrated example, a first virtual character 210 is entering her car 220, and a second virtual character 230 is talking on her phone 240 while walking her dog 250.

The virtual environment engine 164 may store information of the virtual environment in the memory 162 and/or the virtual environment database 169. In this regard, the memory 162 and/or the virtual environment database 169 may store any information related to the virtual environment. For example, the memory 162 and/or the virtual environment database 169, may store information of: events, characters (e.g., virtual characters 210, 230, etc.), buildings, objects (e.g., vehicles, items of the characters, such as tools, weapons, etc.), businesses (e.g., businesses selling items in the virtual environment, etc.), etc.

In some embodiments, the virtual environment includes layers. In some examples, there are 7 virtual environment layers.

FIG. 3 illustrates example layers 300 of an example virtual environment. It should be understood that FIG. 3 is only an example, and the virtual environment may include any number of layers, including more or less layers than as illustrated in the example of FIG. 3.

A first example layer may be an experience layer 310. This layer may provide a representation of spatial dimensions and distances, thereby allowing the user 170 to experience the virtual environment.

A second example layer may be a discovery layer 320. This layer may describe how users discover new experiences. In some examples, there may be both (i) "inbound" discoveries (e.g., "pull") discoveries where users proactively look for experiences (e.g., through search engines, etc.), and (ii) "outbound" discoveries (e.g., "push") discoveries where processes inform users about potential experiences (e.g., through display advertising, emails, social media, notifications, etc.).

A third example layer may be a creator economy layer 330. This example layer may be a layer that includes design tools that enable content creators to produce content, such as digital resources, experiences, assets, etc.

A fourth example layer may be a spatial computing layer 340. This layer may combine AR and/or VR aspects with the virtual environment to bring the virtual environment to life. For example, using AR technology, real-world physical objects may be detected, and characters in the virtual environment may interact with the detected physical objects.

A fifth example layer may be a decentralization layer 350. This layer may enable decentralization so that no one single entity controls the virtual environment.

A sixth example layer may be a human interface layer 360. This layer may define technologies, such as VR/AR headsets, smart glasses, haptic technologies, etc., that enable human-computer interaction (HCI).

A seventh example layer may be an infrastructure layer 370. This layer may concern the technological infrastructure required to produce the virtual environment. Example technologies that may be required to produce the virtual environment include: computing power, artificial intelligence (AI), three-dimensional (3D) engines, display technologies (e.g., AR, VR, mixed reality (MR), XR (e.g., referring to all of AR/VR/MR), etc.), distributed ledger technology, etc.).

An eighth example layer may be an authentication, authorization and integration layer 380. This layer may enable user authentication and authorization, which, in some embodiments, may happen systematically throughout the virtual environment by applying virtual multi-layer and/or same layer authentication and/or authorization. In some examples, the virtual environment server 160 may apply access management policies once the user 170 has been authenticated. For instance, based on a predetermined role of a user 170, a user 170 may be granted access to certain portions of the virtual environment (e.g., a building within the virtual environment), certain documents within the virtual environment, etc. The authentication, authorization and integration layer 380 may be able to expand to physical-virtual reality authorization. Also, this layer may include an intelligent categorization of the tokens so the virtual environment server 170 may learn and know which token is applicable for which layer. For example, when a token is assigned, the virtual environment server 160 may categorize it for a specific layer and for a specific access/action in that layer; furthermore, based on the patterns of experiences, the layer (e.g., that the token is categorized for) may be able to: (i) identify correct authentication and/or authorization, and/or (ii) recommend a journey for enhanced experience to users.

A ninth example layer may be an identity, and access management layer 390. This layer may help ensure that the user authorization happens systematically throughout the virtual environment by applying virtual multi-layer and/or same-layer and/or physical identity and/or access management policies once the user 170 has been authenticated. Users 170 may be granted access authorizations according to their predetermined role in the metaverse. For example, a user 170 may be participating at a virtual concert (experience layer 310), and, within the same layer, the user 170 may have the multiple unique roles, such as of a spectator, singer, organizer, or all at the same time, with different access level authorizations. Similarly, the user 170 may also be able to access the other layers, such as the discovery layer 320 (e.g., the user 170 is part of a social media curation project, etc.). Finally, the authorization may expand and include physical-virtual reality authorization. In one such example, the user 170 may be shopping physically in a mall, and acquire a coupon to use in the virtual environment (or vice-versa, a coupon is acquired in the virtual environment to be used in the physical world). In some embodiments, each use of coupon may require authentication and/or authorization at the identity, and access management layer 390.

To access the virtual environment, in some examples, the user 170 must be authenticated. To this end, the authenticator 166 may authenticate the user 170. For example, the user 170 may be authenticated based upon authentication credentials, such as biometric data received from the user device 175 (e.g., a VR headset automatically gathers biometric data and sends it as part of the authentication process).

Additionally or alternatively to authenticating the user 170, the authenticator 166 may authenticate the computer security server 102. Once authenticated, in some embodiments, the insurance server 102 may be permitted by the virtual environment server 160 to provide computer security services to users of the virtual environment (e.g., user 170). For example, as will be described elsewhere herein, the computer security server 102 may provide security to the virtual environment.

For instance, bad actors, for financial gain, may attempt to exploit security weaknesses in the virtual environment and/or attempt to defraud virtual environment users. To this end, the bad actors may employ traditional computer security attacks, as well as new attacks specific to the virtual environment. To counter these threats, the systems and methods described herein provide the computer security server 102. For example, the computer security sever 102 may detect, in data that it receives, an event (e.g., a pattern in the data it receives indicating a security threat). The computer security server 102 may then provide a ranked list of solutions to the event.

The computer security server 102 may include one or more processors 120 such as one or more microprocessors, controllers, and/or any other suitable type of processor. The computer security server 102 may further include a memory 122 (e.g., volatile memory, non-volatile memory) accessible by the one or more processors 120, (e.g., via a memory controller). The one or more processors 120 may interact with the memory 122 to obtain and execute, for example, computer-readable instructions stored in the memory 122. Additionally or alternatively, computer-readable instructions may be stored on one or more removable media (e.g., a compact disc, a digital versatile disc, removable flash memory, etc.) that may be coupled to the insurance server 102 to provide access to the computer-readable instructions stored thereon. In particular, the computer-readable instructions stored on the memory 122 may include instructions for executing various applications, such as computer security engine 124.

Figure 4:
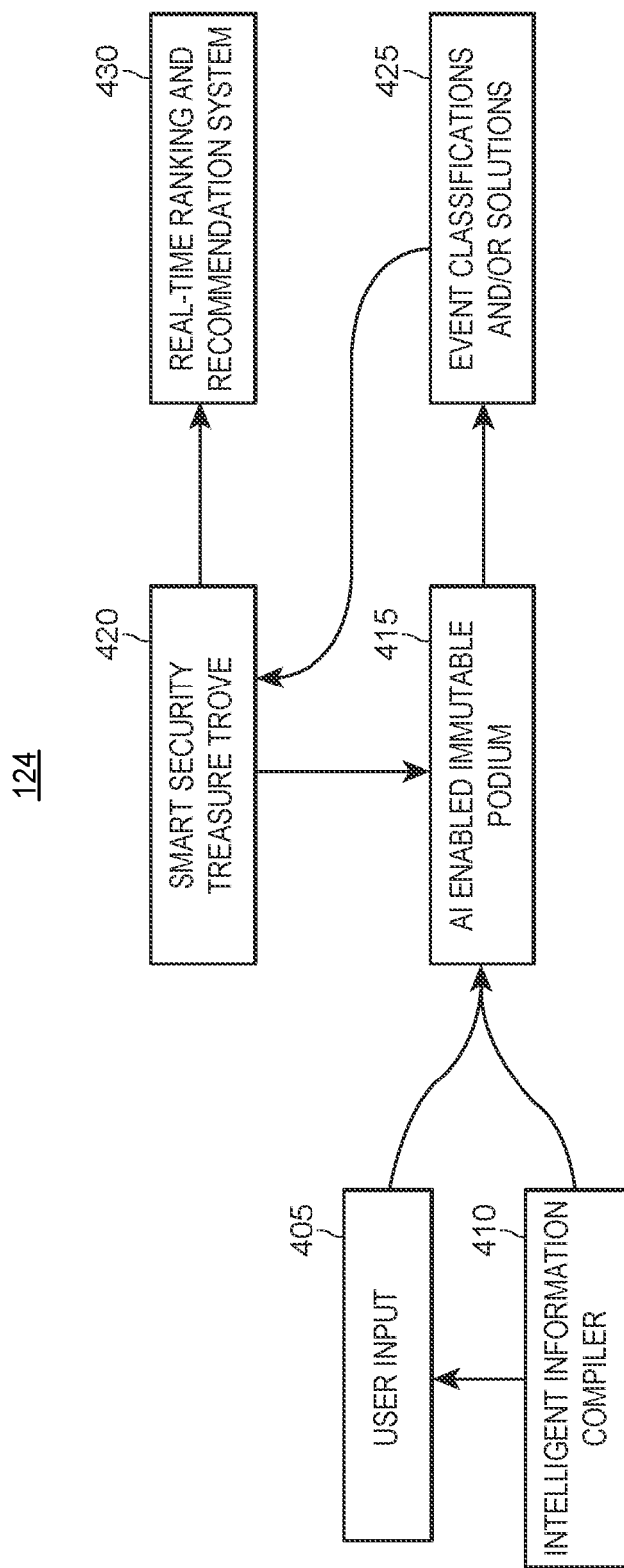
FIG. 4 depicts an example computer security engine.

An example of the computer security engine 124 is depicted by FIG. 4. Within the example computer security engine 124, block 405 shows the user input received by the computer security engine 124. The user input 405 may be any suitable input, such as input from the user device 175 (e.g., input controlling a character in the virtual environment, input making purchases in the virtual environment, input sending messages to other virtual environment users, etc.).

Block 410 shows an intelligent information compiler 410. In some examples, the intelligent information compiler 410 receives information, such as virtual environment information, from the virtual environment server 160. Examples of the received virtual environment information include data of virtual environment: people, process, objects, infrastructure, artifacts, technology, etc. In some embodiments, the intelligent information compiler also extracts and/or classifies the received virtual environment information to prepare the virtual environment information for machine learning consumption (e.g., at the AI enabled immutable podium 415). Advantageously, this preparation of data reduces the amount of data that is saved on the distributed ledger (e.g., by the AI immutable podium 415).

The AI immutable podium 415 gathers data from the user input 405, and the intelligent information compiler 410. The AI immutable podium 415 may also gather data from the smart security treasure trove 420, as will be further explained below. The AI immutable podium 415 may store the gathered data to a distributed ledger, such as distributed ledger 130, as will be explained further below.

Additionally or alternatively, the AI immutable podium 415 may detect events (e.g., security threats, etc.) in the data that it receives. For example, the AI immutable podium 415 may analyze the data it receives according to classifications in a set of known events to detect and/or classify events in the received data.

Figure 5:
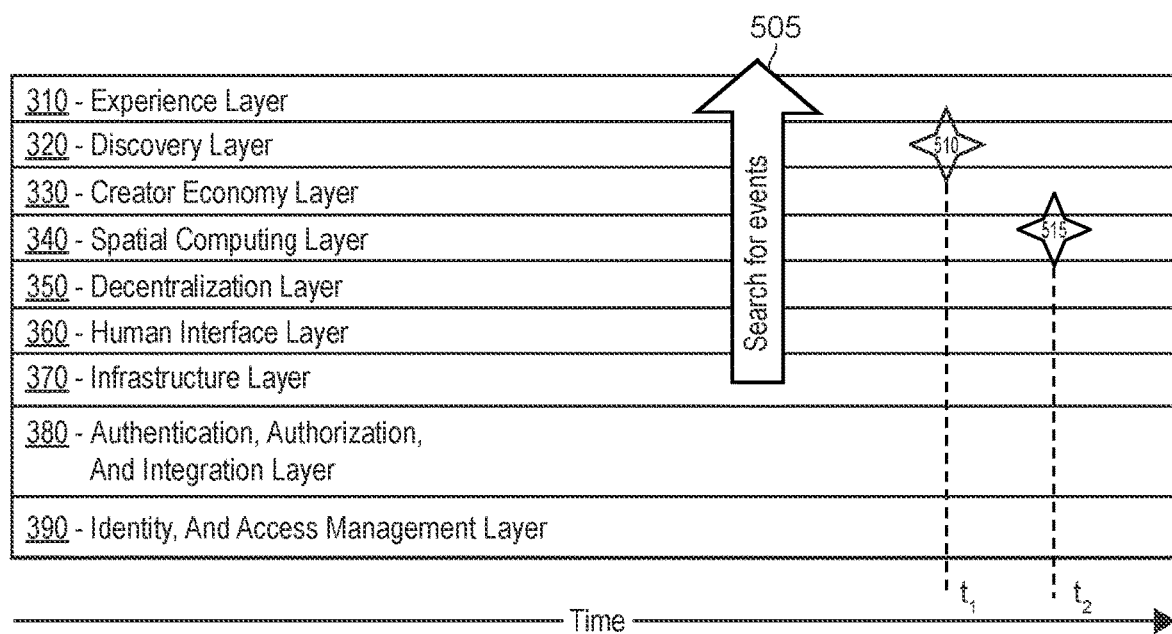
FIG. 5 depicts an example of detecting events in layers of a virtual environment.

The AI immutable podium 415 may detect events both in different layers and at different times. In one example illustration, FIG. 5 shows an example of detecting events in layers of a virtual environment. In particular, FIG. 5 shows the example layers 310-370, and shows that a search 505 may be conducted though any or each of the layers 310-370. For example, the AI immutable podium 415 may search each of the layers by matching data of the layers to a set of known events with classifications for each event type. In some instances, this search through the layers 310-370 is referred to as a "vertical" search.

The AI immutable podium 415 may also search the data at different points in time of the data. In some instances, the search through different points in time is referred to as a "horizontal" search. In the example of FIG. 5, event 510 is identified at time $t_1$ in layer 320, and event 515 is identified at time $t_2$ in layer 340.

Additionally or alternatively, the AI immutable podium 415 may apply one or more machine learning algorithms to the collected data. As will be discussed elsewhere herein, in some embodiments, the AI immutable podium uses two different machine learning algorithms: an event machine learning algorithm, and a solution machine learning algorithm. The event machine learning algorithm may be trained, for example, to detect and/or classify events, determine new event classifications, determine trends in classifications of events, predict future events, etc. The solution machine learning algorithm may be trained to, for example, determine solutions, and/or rank solutions.

Thus, the AI enabled immutable podium may produce the event classifications and/or solutions 425, which may be feed into the smart security treasure trove 420.

The smart security treasure trove 420, which may also run one or both of the event machine learning algorithm and/or the solution machine learning algorithm, may make correlations between detected events. The correlations may be made based on any suitable criteria. For example, events with the same classification may be correlated together. In this regard, events may be correlated together (e.g., based on event classification) may be correlated together even though they occur in different layers, and/or at different points in time. Additionally or alternatively, events may also be correlated based on time (e.g. events occurring at the same time are correlated together) and/or based on layers that they occur in.

The real-time ranking and recommendation system 430, which may also run one or both of the event machine learning algorithm and/or the solution machine learning algorithm, may then use data from the smart security treasure trove 420 to determine solutions to the events, and/or rank solutions (e.g., including the determined solutions).

Returning now to FIG. 1, the example system 100 may further include graph database 190, which may store any suitable data, such as correlations made by the computer security engine 124. Advantageously, the graph database may be purposefully built to store and navigate relationships (e.g., between events). To this end, the graph database 190 may be configured to have entity nodes (e.g., the events), and edges (e.g., connections between the entity nodes, such as the determined correlations). Storing the data is this way is advantageous because it reduces query time.

The example system 100 may further include distributed ledger 130. As mentioned above, the distributed ledger 130 may be advantageously used to store data, such as data gathered and/or determined by the AI immutable podium 415.

The distributed ledger 130 may be maintained by a plurality of nodes, such as nodes 150, 159. According to embodiments, the nodes 150, 159 may be a combination of hardware and software components. The nodes 150, 159 may each include a memory 156, one or more processors 154, such as a microcontroller or a microprocessor, and other components not shown in FIG. 1 (e.g., a random-access memory (RAM), and/or an input/output (I/O) circuit), all of which may be interconnected via an address/data bus.

The memory 156 and/or RAM may store various applications for execution by the one or more processors 154. For example, a user interface application may provide a user interface to the node 150, which user interface may, for example, allow the system administrator to configure, troubleshoot, and/or test various aspects of the node's operation.

The memory 156 may be tangible, non-transitory memory and may include any types of suitable memory modules, including RAM, read-only memory (ROM), flash memory, other types of persistent memory, etc. The memory 156 may store, for example, instructions executable on the processors 154 for a validator module 158.

The validator module 158 may validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. Consensus rules may include a mechanism to determine the order in which new blocks are added to the chain (e.g., through a proof-of-work system, proof-of-stake, etc.).

The validator module 158 may append distributed ledger data to the distributed ledger 130 if the distributed ledger data satisfies the consensus rules by generating a new block of validated transactions to include in the distributed ledger 130 and/or by broadcasting a block of transactions to other nodes. Otherwise, the validator module 158 may disregard any distributed ledger data that does not satisfy the consensus rules, and the distributed ledger data is not propagated to other nodes.

Figure 6:
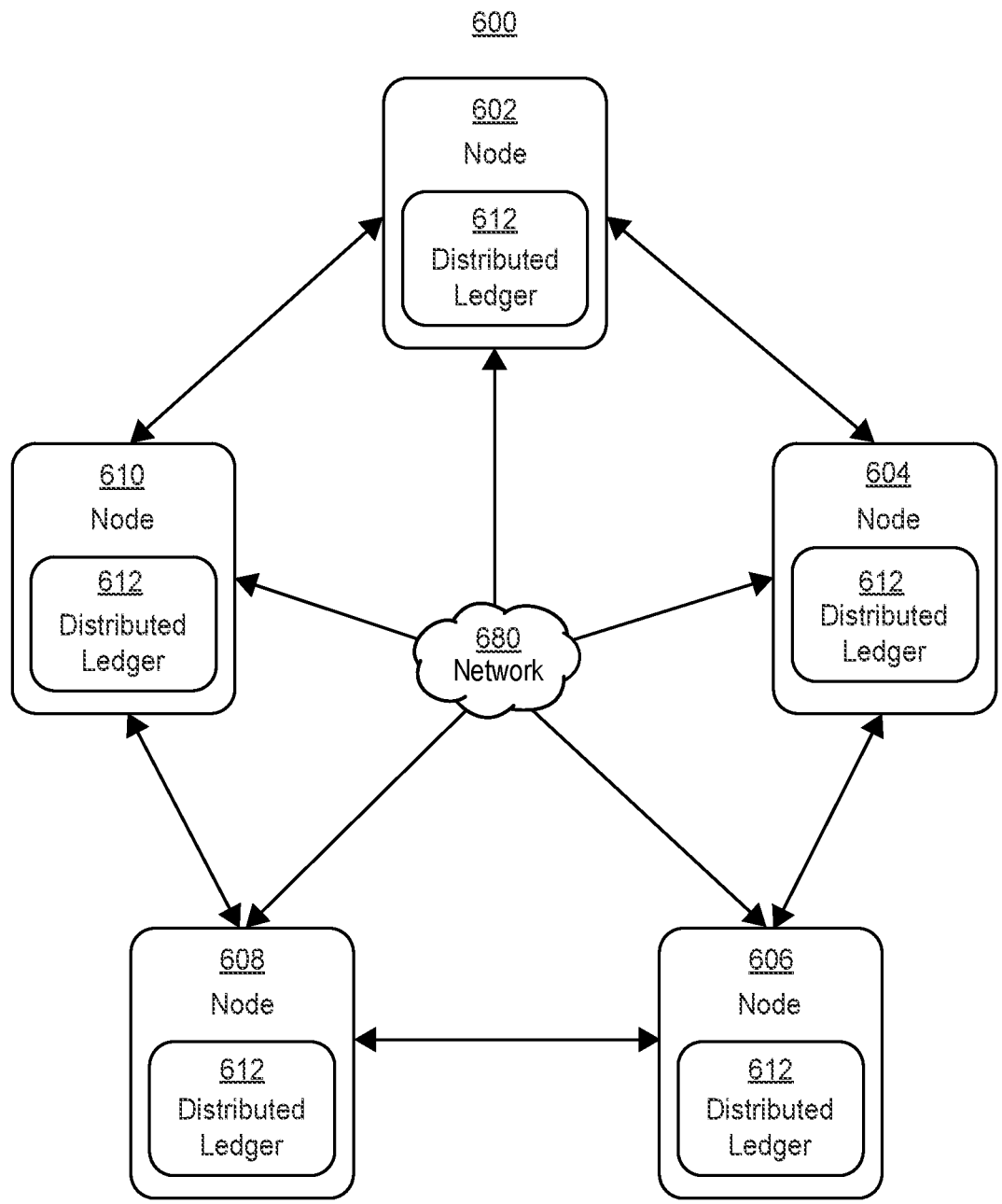
FIG. 6 depicts exemplary network nodes and an exemplary distributed ledger.

To further illustrate, FIG. 6 depicts an exemplary distributed ledger system 600 for improving computer security in a virtual environment. The system 600 may include a distributed ledger 612 (e.g., having one or more distributed ledger layers) and a plurality of nodes 602, 604, 606, 608, and 610 (e.g., each similar to node 150, 159 of FIG. 1). Each node maintains a copy of the distributed ledger 612. As changes are made to the distributed ledger 612, each node receives the change via the network 680 and updates its respective copy of the distributed ledger 612. A consensus mechanism may be used by the nodes 602-610 in the distributed ledger system 600 to decide whether it is appropriate to make received changes to the distributed ledger 612 or to a particular layer of the distributed ledger 612.

Each node in the system therefore has its own copy of the distributed ledger 612, which is identical to every other copy of the distributed ledger 612 stored by the other nodes. The distributed ledger system 600 may be more robust than a central authority database system because of the distributed ledger's decentralized nature. As such, there is no single point of failure on the distributed ledger system 600 as there would be in a centralized system.

Figure 7:
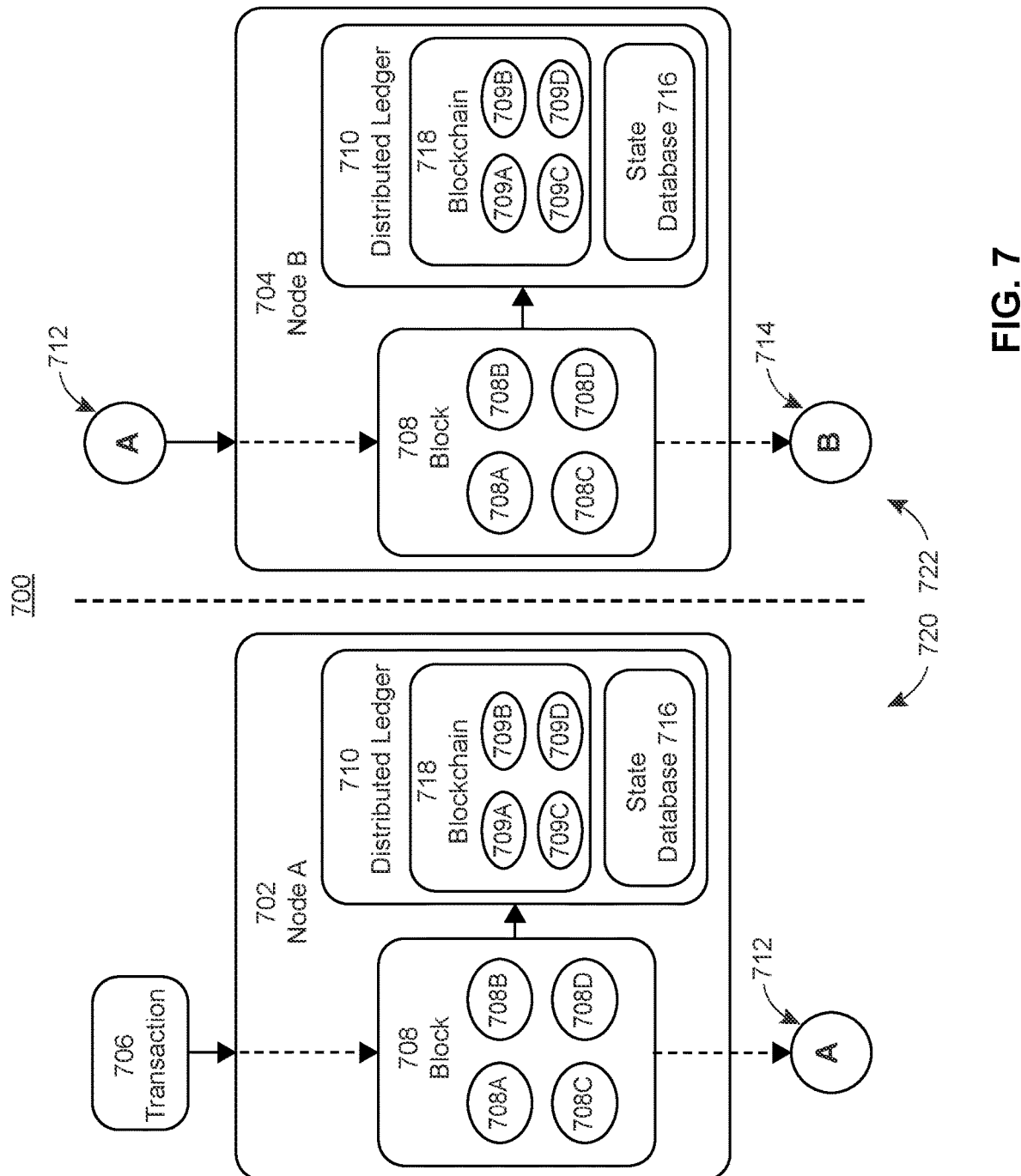
FIG. 7 depicts exemplary network nodes, and an exemplary transaction flow on a distributed ledger network.

FIG. 7 depicts exemplary network nodes and an exemplary transaction flow 700 on a distributed ledger network for improving computer security in a virtual environment. FIG. 7 includes two time frames 720 and 722 represented by the left and right sides of the dotted line, respectively, Node A 702 (e.g., node 150, etc.) and Node B 704 (e.g., node 159, etc.), a set of transactions 708A-708D, a set of blocks of transactions 709A-709D, a distributed ledger 710, and a blockchain 718.

The block propagation flow 700 may begin with Node A 702 receiving transaction 706 at time 720. When Node A 702 confirms that transaction 706 is valid, Node A 702 may add the transaction to a newly generated block 708. As part of adding the transaction 706 to block 708, Node A 702 may solve a cryptographic puzzle and include the solution in the newly generated block 708 as proof of the work done to generate the block 708. Alternatively, a proof of stake algorithm may be used to generate the block 708, whereby Node A 702 "stakes" an amount of a digital token used on the network, however, the network itself determines the node that will mint the new block. In another implementation, a proof of authority (PoA) algorithm may be used to generate the block 708, where transactions and blocks are validated by approved accounts, known as validators which run software allowing them to record transactions in the distributed ledger.

In other embodiments, the transaction 706 may be added to a pool of transactions until a sufficient number of transactions in the pool exist to form a block or distributed ledger entry. Node A 702 may transmit the newly created distributed ledger entry 708 to the network at time 712. Before or after propagating the distributed ledger entry 708, Node A 702 may add the distributed ledger entry 708 to its copy of the blockchain 718.

While proof of work, proof of stake, and proof of authority are described herein as consensus algorithms for selecting a node to mint a new block, these are merely a few example consensus algorithms and are not intended to be limiting. Additional consensus algorithms may be utilized, such as delegated proof of stake where nodes elect a subset of nodes referred to as delegates to perform validation, and the delegates take turns minting new blocks. Consensus algorithms may also include proof of weight, Byzantine fault tolerance, tangle consensus algorithms, block lattice consensus algorithms, etc. Additionally, quorum slices may be selected where a quorum is a set of nodes that participate in the consensus protocol and a quorum slice is its subset that helps a node in its agreement process. Individual trust decisions may be made by participants in the distributed ledger network to construct a quorum slice. Still further, security circles may be identified which are closed groups of network participants who together can form a quorum to reach a consensus on a transaction and to make further trust decisions.

In any event, the transactions 709A-709D may include updates to a state database 716. The state database 716 may contain current values of variables created by smart contracts deployed on the blockchain 718. Validated distributed ledger entries, such as distributed ledger entry 708, may include transactions effecting state variables in state database 716. At time 722, Node B 704 may receive the newly created distributed ledger entry 708 via the network at 712. Node B 704 may verify that the distributed ledger entry 708 is valid by checking the solution to the cryptographic puzzle provided in the distributed ledger entry 708. If the solution is accurate, then Node B 704 may add the distributed ledger entry 708 to its blockchain 718 and make any updates to the state database 716 as rejected by the transactions in distributed ledger entry 708. Node B 704 may then transmit the distributed ledger entry 708 to the rest of the network at time 714.

Figure 8:
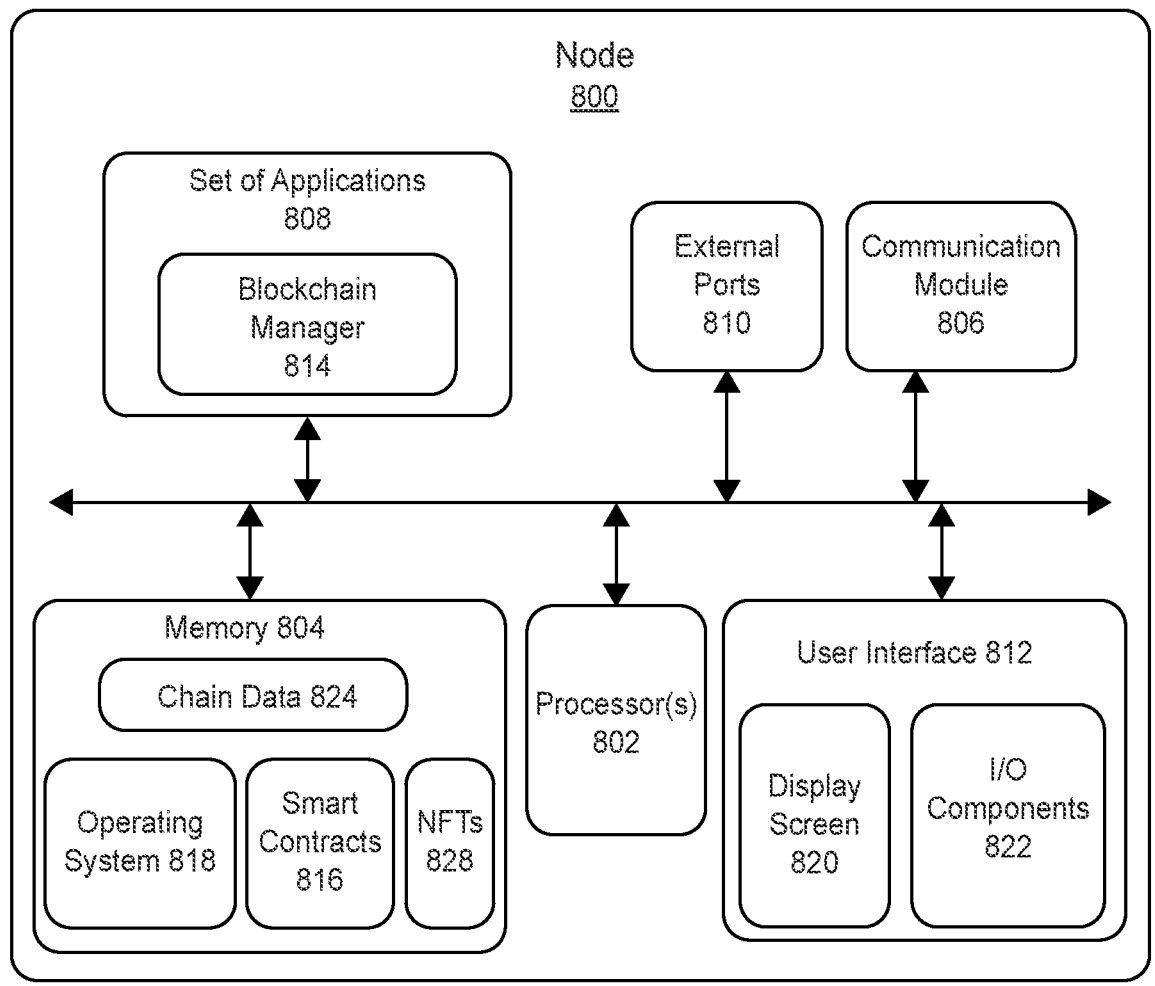
FIG. 8 depicts exemplary components of a network node on a distributed ledger network.

FIG. 8 depicts exemplary components of a network node 800 on a distributed ledger network for improving computer security in a virtual environment. The network node 800 may be similar to the network nodes 150, 159 described above with reference to FIG. 1. Network node 800 may include at least one processor 802, memory 804, a communication module 806 such as a transceiver, a set of applications 808, external ports 810, a blockchain manager 814, smart contracts 816, NFTs 828, an operating system 818, user interface 812, display screen 820, and/or I/O components 822. In some embodiments, the network node 800 may generate a new block of transactions, or may broadcast transactions to other network nodes via the communication module 806 by using the blockchain manager 814. Similarly, the network node 800 may use the blockchain manager 814 in conjunction with the NFTs 828 and/or the smart contracts 816 stored in the memory 804 to provide the functionality disclosed herein. The memory 804 may further include chain data 824 including, for example, a state database of the blockchain for storing states of smart contracts deployed thereon.

In other embodiments, the smart contracts 816 operate independent of the blockchain manager 814 or other applications. In some embodiments, the network node 800 does not have a blockchain manager 814, NFTs 828, or smart contracts 816 stored at the network node. In some embodiments, the network node 800 may have additional or fewer components than described.

To return to and conclude the discussion of FIG. 1, it should be noted that the illustrated example components may be configured to communicate, e.g., via a network 104 (which may be a wired or wireless network, such as the internet), with any other component. Furthermore, although the example system 100 illustrates only one of each of the components, any number of the example components are contemplated (e.g., any number of users, user devices, virtual environment servers, nodes, computer security servers, etc.).

Example methods

Figure 9:
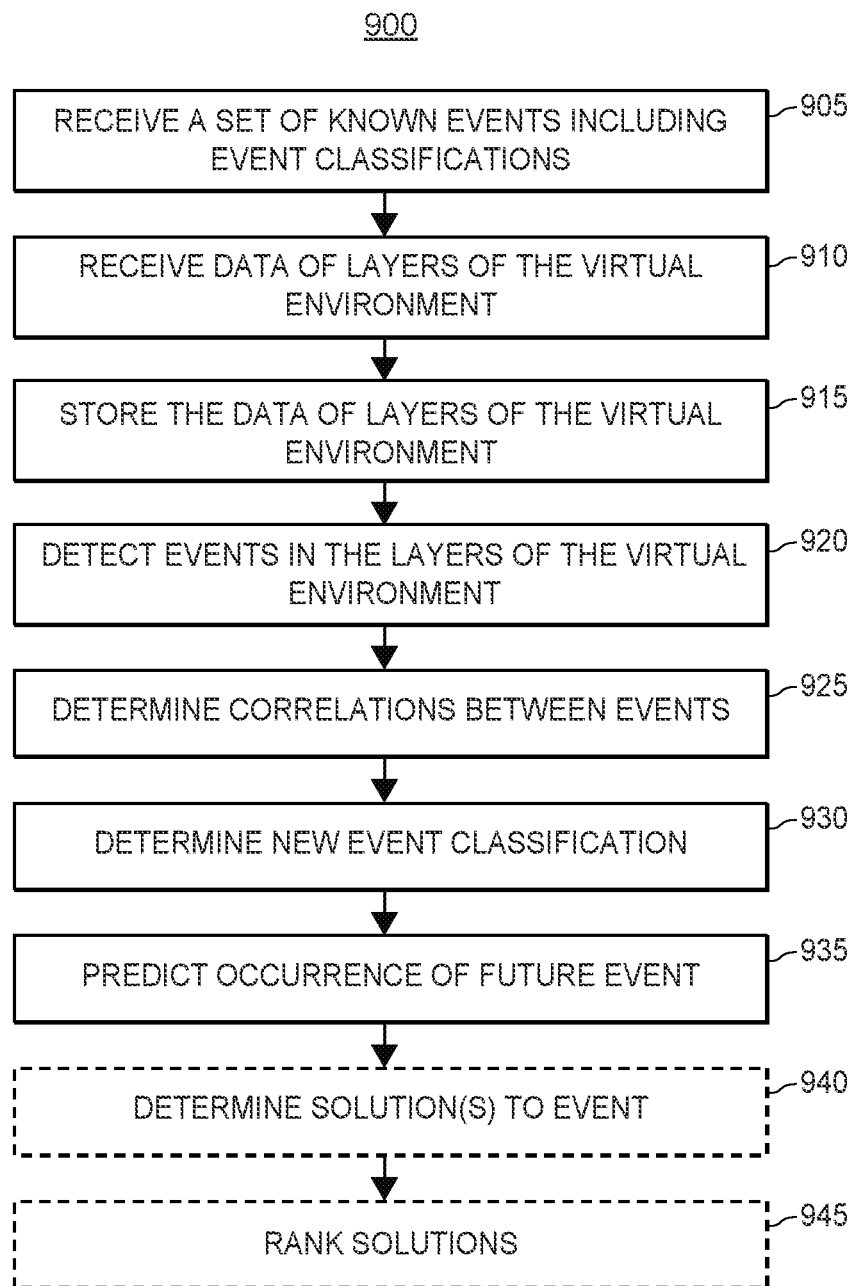
FIG. 9 shows an exemplary computer-implemented method or implementation of improving security in a virtual environment, according to an embodiment.

FIG. 9 shows an exemplary computer-implemented method or implementation 900 of improving security in a virtual environment.

The method may begin at block 905 when the one or more processors 120 receive a set of known events including event classifications. In some examples, the events are known patterns in the data that indicate security threats.

Examples of the classifications include: a character movement classification (e.g., virtual character is repeating movements in a same location, etc.), a click pattern classification, a message pattern classification (e.g., user or character is repeatedly sending the same message or a pattern of messages, etc.), an overlay classification (e.g., undesired content is displayed on a user's 170 view), disorientation classification (e.g., an attack intended to disorientate a user 170), an attack on an NFT database classification (e.g., a hacking attempt or other attempt to steal data from an NFT database), a financial fraud classification (e.g., an attempt to defraud the user 170 of money), a privacy data violation classification (e.g., an attempt to steal the user's 170 private data), a denial of service (DoS) attack classification (e.g., a computer floods a target server with transmission control protocol (TCP) and/or user diagram protocol (UDP) packets, etc.), a distributed denial of service attack (DDoS) attack classification (e.g., multiple computers target a server with DoS attacks), and/or a ransomware attack classification. In some embodiments, there may be multiple classifications for any or each of these example classifications. For instance, for the message pattern classification, there may be multiple patterns of a user sending messages, each with its own classification. For example, there may be a first classification for a first message sending pattern, a second classification for a second message sending pattern, and so on. In another example, there may be a first classification for a first click pattern, a second classification for a second click pattern, and so on.

At block 910, the one or more processors 120, receive data of layers of the virtual environment. The data of layers of the virtual environment may correspond to any or all of the layers of the virtual environment (e.g., data gathered from each layer, etc.). Examples of the data of layers of the virtual environment include the examples discussed above for the user input 405, and intelligent information compiler 410. Examples of the layers include those discussed above with respect to FIG. 3.

At block 915, the one or more processors 120 store the received data of the layers of the virtual environment (e.g., in the memory 122, the data store 118, the distributed ledger 130, etc.). Advantageously, storing the data of the layers of the virtual environment on the distributed ledger 130 creates an immutable record of the data, which may be useful for future analysis.

At block 920, the one or more processors detect events in the layers of the virtual environment (e.g., as in the example of FIG. 5). For example, the one or more processors 120 may compare classifications of the received set of known events to data of a layer. If the comparison shows that the classification matches or is within a predetermined similarity tolerance of the data of the layer, the one or more processors 120 may detect an event.

The one or more processors 120 may thus also classify the detected events (e.g., a detection from match between a classification and data indicates that the detected event corresponds to the classification type).

Furthermore, in some embodiments, the one or more processors 120 may apply a natural language processing (NLP) engine to the data of the layers of the virtual environment as part of the process for detecting an event. For example, an NLP engine may be applied to messages sent between users of the virtual environment, messages sent between characters, signs displayed by businesses in the virtual environment, etc. Advantageously, this may be useful in detecting certain classifications of events, in particular message pattern classifications, disorientation classifications, and financial fraud classifications. In one such example, the one or more processors may apply the NLP engine to a message sent by a virtual character as part of detecting a financial fraud event classification (e.g., virtual character sends message prompting another virtual character to send money in exchange for goods known to be fraudulent).

Once the events are detected and/or classified, the events may optionally be stored (e.g., in the memory 122, the data store 118, the distributed ledger 130, etc.). Advantageously, storing the data of the layers of the virtual environment on the distributed ledger 130 creates an immutable record of the detected events, which may be useful for future analysis. The events may be stored (e.g., on the distributed ledger 130, etc.) along any information of the detected events, such as event classifications, a layer that the event occurred in, times of the detected events, etc. Advantageously, this enables future analysis of the detected events based on times, etc., of the detected events (e.g., an analysis that correlates events based on times that they occurred).

At block 925, the one or more processors 120 may determine correlations between detected events. The correlations may be determined based on any suitable criteria. For example, events of the same classification may be correlated together. Advantageously, such events may be correlated together even though they occur in different layers and/or at different times. To illustrate in one example, with reference to FIG. 5, if the events 510 and 515 have the same classification, they may be correlated together even though they occur in different layers, and at different times.

Furthermore, events may be correlated together based on times that they occur. In some examples, this advantageously leads to the discover that certain event classifications often follow other certain event classifications. For example, it may be found that a disorientation event classification is often followed by a financial fraud event classification.

Furthermore, in some embodiments, the correlations may be determined by a machine learning algorithm, or determined as part of running a machine learning algorithm.

Once the events are correlated, the correlations may optionally be stored (e.g., in the memory 122, the data store 118, the graph database 190, the distributed ledger 130, etc.). Advantageously, the correlations may be stored in the graph database 190 as edges between entity nodes (e.g., entity nodes representing detected events). This is advantageous because it reduces query time.

Additionally or alternatively, storing the data of the layers of the virtual environment on the distributed ledger 130 advantageously creates an immutable record of the correlations, which may be useful for future analysis. The correlations and/or correlated events may be stored (e.g., on the distributed ledger 130, etc.) along any information of the correlations and/or correlated events, such as event classifications, layer(s) that the correlated events occurred in, times of the correlated events, etc. Advantageously, this enables future analysis of the correlations based on classifications, etc.

At block 930, the one or more processors 120 may determine a new event classification (e.g., a classification not included in the set of known events), such as by using an event machine learning algorithm (e.g., a machine learning algorithm trained to determine new event classifications, detect and/or classify events, determine trends in classifications of events, predict future events, etc.). In one working example, the set of known events (received at 905) includes five click pattern classifications known to be security threats. An event machine learning algorithm then, based on the determined correlations, determines a sixth click pattern classification. In some embodiments, the same event machine learning algorithm that determines the correlations also determines the new event classification.

Additionally or alternatively to determining a new event classification, the one or more processors 120 may determine a modification to a classification from the set of known events, such as by using an event machine learning algorithm. For example, an overlay classification may involve overlaying a box on a display. The event machine learning algorithm may determine that a trend (e.g., over the last two years, etc.) has been for the box to become larger or smaller. The event machine learning algorithm may then determine a new classification based on the trend (e.g., an overlay classification with a larger or smaller box).

Additionally or alternatively to using one event machine learning algorithm, multiple event machine learning algorithms may be used. For example, separate event machine learning algorithms may be applied for any or each of the classifications included in the set of known events. For instance, when the data of layers of the virtual environment is detected and classified, data of that event may be routed into an event machine learning algorithm specific to that event classification. The specific event machine learning algorithm may then determine the modification to the event classification (e.g., by analyzing trends over time to determine how user behavior with respect to the event classification is changing over time, etc.).

At block 935, the one or more processors 120 predict an occurrence of a future event. The prediction may include a prediction of a time or range of times (e.g., a one week range, a one month range, etc.) the predicted event will occur, a classification of the future event (e.g., a particular click pattern, etc.), a layer that the future event will occur in. Advantageously, if a range of times is predicted, the virtual environment server 160 may implement extra countermeasures/solutions specifically during that range of times. This advantageously allows for optimal balancing of resources (e.g., the additional countermeasure/solution resources are only spent when necessary).

The prediction may be made using any suitable technique. For example, an event machine learning algorithm may be used to make the prediction. Such an event machine learning algorithm may be trained using any suitable technique. For example, the event machine learning algorithm may be trained using historical data of layers of the virtual environment, data of historical events (e.g., including times that the historical events occurred, layers that the historical events occurred in, classifications of the historical events, etc.), and/or historical correlations between events.

In some embodiments, the data of historical events is routed as a table to the event machine learning algorithm to train the event machine learning algorithm. To this end, FIG. 10 depicts an example table 1000 of data of historical events 1010.

In some examples, the event machine learning algorithm may discover that a particular event classification is correlated with a particular time (e.g., financial fraud classification correlated with a particular month of the year, etc.).

In some examples, the predicted future event is a prediction of an event with the new event classification determined at 930.

In some implementations, in response to the prediction, the one or more processors 120 may generate an audio or visual alert. The audio or visual alert may be displayed/sounded at the computer security server 102 and/or the virtual environment server 160. Advantageously, this may alert personnel of the predicted event.

Additionally or alternatively, in response to the prediction, the one or more processors 120 may alert a law enforcement agency of the prediction.

At optional block 940, the one or more processors 120 determine a solution (or set of solutions) to the event predicted at block 935. The solutions may include any suitable solutions. Examples of the solutions include temporarily suspending a virtual environment account, permanently disabling a virtual environment account, blocking a message in the virtual environment, adding a warning label to the message in the virtual environment, triggering an audio or visual alarm (e.g., presented on a display of the virtual environment server 160, and/or a display of the computer security server 102), and alerting law enforcement.

The solution(s) may be determined by any suitable technique. For example, the solution(s) may be determined by using a machine learning algorithm (e.g., a solution machine learning algorithm). In some embodiments, the solution machine learning algorithm is trained using historical event data as inputs (e.g., also referred to as independent variables, or explanatory variables), and historical solution data as outputs (e.g., also referred to as a dependent variables, or response variables).

FIG. 11 shows an example table 1100 of the historical event data. In the illustrated example, the historical event data 1110 comprise the independent variables/explanatory variables, and the solution data 1120 comprise the dependent variables/response variables. The event data includes times of the historical events, classifications of the historical events, and layers of the historical events. The solution data includes types of the solutions and effectiveness scores of the solutions. The effectiveness scores may be obtained by any suitable techniques. For example, a human may manually enter the effectiveness scores. In another example, the effectiveness scores may be automatically determined (e.g., by the solution machine learning algorithm or any other algorithm), such as based on recurrences (or lack thereof) of the event following implementation of the solution, etc.

In some embodiments, once a solution has been determined at 940, the solution may automatically be implemented. For example, the one or more processors 120 may determine a solution to a message pattern event classification to be adding a warning label (e.g., placing a label on a message as "this message has been determined to be potentially fraudulent").

In other embodiments, prior to implementation of the solution, an administrator, such as the virtual environment server 160 and/or human user of the virtual environment server, must approve the solution. For example, prior to labeling any messages, the administrator may be presented with a request to approve labeling a message or group of messages. In some such examples, the administrator may also be presented with the actual text of the proposed label (e.g., "this message has been determined to be potentially fraudulent"). In other such examples, the administrator is not presented with a proposed text, and rather is simply asked for approval to label the message(s). In still other such examples, the administrator enters the text for the label to be added to the message (e.g., the administrator is prompted to add text, and the administrator then enters the text: "this message has been determined to be potentially fraudulent").

By approving, rejecting or modifying proposed solutions, the administrator thus creates feedback that may be used to further train the solution machine learning algorithm (e.g., through reinforcement learning techniques, or other techniques). In some such examples, the feedback is used to increase or decrease the effectiveness score of a solution to an event.

As discussed above, a set of solutions may be determined at block 940. At block 945 the determined solutions may be ranked. The ranking may be done by any suitable technique. For example, the one or more processors may rank the solutions based upon effectiveness scores generated by the solution machine learning algorithm. Additionally or alternatively, the solutions may be manually ranked. For example, the one or more processors 120 may present the administrator with a proposed ranking, and the administrator may then accept, reject, or modify the proposed ranking.

Again, the administrator's input here creates feedback that may be used to further train the solution machine learning algorithm (e.g., through reinforcement learning techniques, or other techniques). For example, the solution machine learning algorithm may modify effectiveness scores of solutions based on the received feedback from the administrator.

Further regarding the example flowcharts provided above, it should be noted that all blocks are not necessarily required to be performed. Moreover, additional blocks may be performed although they are not specifically illustrated in the example flowcharts. In addition, the example flowcharts are not mutually exclusive. For example, block(s) from one example flowchart may be performed in another of the example flowcharts.

Additional exemplary embodiments—Improving computer security by determining correlations between events Aspect 1. A computer-implemented method for improving security in a virtual environment by determining correlations between events in the virtual environment, the method comprising:

receiving, via one or more processors, data of layers of the virtual environment, wherein the virtual environment is configured to allow a user to interact with a virtual world;

detecting, via the one or more processors, events in the data of the layers of the virtual environment; and determining, via the one or more processors, correlations between the events in the data of the layers of the virtual environment, wherein at least one correlation of the determined correlations is between events of different layers in the virtual environment.

Aspect 2. The computer-implemented method of aspect 1, further comprising:

receiving, via the one or more processors, a set of known events including event classifications; and wherein the detecting the events in the data comprises, via the one or more processors: (i) detecting the events according to the event classifications, and (ii) classifying the detected events into the event classifications; and wherein the determining, via the one or more processors, the at least one correlation between events of different layers is determined by correlating events according to the classifications.

Aspect 3. The computer-implemented method of any of aspects 1-2, wherein the event classifications in the set of known events include: a character movement classification, a click pattern classification, a message pattern classification, an overlay classification, disorientation classification, an attack on an NFT database classification, a financial fraud classification, a privacy data violation classification, a denial of service (DoS) attack classification, a distributed denial of service attack (DDoS) attack classification, and/or a ransomware attack classification.

Aspect 4. The computer-implemented method of any of aspects 1-3, further comprising:

receiving, via the one or more processors, a set of known events including event classifications; and determining, via the one or more processors, a new event classification by using an event machine learning algorithm to determine the new event classification based on the determined correlations between events.

Aspect 5. The computer-implemented method of any of aspects 1-4, further comprising receiving, via the one or more processors, a set of known events including event classifications;

wherein the detecting the events in the data comprises, via the one or more processors: (i) detecting the events according to the event classifications, and (ii) classifying the detected events into the event classifications; and wherein the method further comprises routing, via the one or more processors, data of the classified events into respective event machine learning algorithms corresponding to the classified events to (i) determine a new event classification, and/or (ii) modify an classification included in the set of known events.

Aspect 6. The computer-implemented method of any of aspects 1-5, wherein the layers of the virtual environment comprise:

an experience layer;
a discovery layer;
a creator economy layer;
a spatial computing layer;
a decentralization layer;
a human interface layer;
an infrastructure layer;
an authentication, authorization and integration layer; and/or
an identity and access management layer.

Aspect 7. The computer-implemented method of any of aspects 1-6, further comprising:

storing, via the one or more processors, the determined correlations, wherein each correlation is stored along with: (i) event types of each of the correlated events, (ii) time stamps of each of the correlated events, and (iii) indications of layers that each of the correlated events occurred in.

Aspect 8. The computer-implemented method of any of aspects 1-7, further comprising receiving, via the one or more processors, a set of known events including event classifications; and wherein the method further comprises analyzing, via the one or more processors, the data of the layers of the virtual environment to determine a new classification of an event, wherein the new classification is not in the set of known events.

Aspect 9. The computer-implemented method of any of aspects 1-8, further comprising storing, via the one or more processors, data of the detected events including times of the detected events on a distributed ledger.

Aspect 10. The computer-implemented method of any of aspects 1-9, further comprising building, via the one or more processors, a graph database including (i) entity nodes corresponding to the detected events, and (ii) edges between the entity nodes corresponding to correlations between events.

Aspect 11. A computer system for improving security in a virtual environment by determining correlations between events in the virtual environment, the computer system comprising one or more processors configured to:
receive data of layers of the virtual environment, wherein the virtual environment is configured to allow a user to interact with a virtual world;
detect events in the data of the layers of the virtual environment; and
determine correlations between the events in the data of the layers of the virtual environment, wherein at least one correlation of the determined correlations is between events of different layers in the virtual environment.

Aspect 12. The system of aspect 11, wherein the one or more processors are further configured to:
receive a set of known events including event classifications;
detect the events by: (i) detecting the events according to the event classifications, and (ii) classifying the detected events into the event classifications; and
determine the at least one correlation between events of different layers by correlating events according to the classifications.

Aspect 13. The system of any of aspects 11-12, wherein the event classifications in the set of known events include: a character movement classification, a click pattern classification, a message pattern classification, an overlay classification, disorientation classification, an attack on an NFT database classification, a financial fraud classification, a privacy data violation classification, a denial of service (DoS) attack classification, a distributed denial of service attack (DDoS) attack classification, and/or a ransomware attack classification.

Aspect 14. The system of any of aspects 11-13, wherein the one or more processors are further configured to:
receive a set of known events including event classifications; and
determine a new event classification by using an event machine learning algorithm to determine the new event classification based on the determined correlations between events.

Aspect 15. The system of any of aspects 11-14, wherein the one or more processors are further configured to:
receive a set of known events including event classifications;
detect the events by: (i) detecting the events according to the event classifications, and (ii) classifying the detected events into the event classifications; and
route data of the classified events into respective event machine learning algorithms corresponding to the classified events to (i) determine a new event classification, and/or (ii) modify an classification included in the set of known events.

Aspect 16. A computing device for providing incentives or disincentives to an insured customer during the term of an insurance policy, the computing device comprising:
one or more processors; and
one or more memories;
the one or more memories having stored thereon computer-executable instructions that, when executed by the one or more processors, cause the computing device to:
receive data of layers of the virtual environment, wherein the virtual environment is configured to allow a user to interact with a virtual world;
detect events in the data of the layers of the virtual environment; and
determine correlations between the events in the data of the layers of the virtual environment, wherein at least one correlation of the determined correlations is between events of different layers in the virtual environment.

Aspect 17. The computing device of aspect 16, the one or more memories having stored thereon computer executable instructions that, when executed by the one or more processors, cause the computing device to further:
receive a set of known events including event classifications;
detect the events by: (i) detecting the events according to the event classifications, and (ii) classifying the detected events into the event classifications; and
determine the at least one correlation between events of different layers by correlating events according to the classifications.

Aspect 18. The computing device of any of aspects 16-17, wherein the event classifications in the set of known events include: a character movement classification, a click pattern classification, a message pattern classification, an overlay classification, disorientation classification, an attack on an NFT database classification, a financial fraud classification, a privacy data violation classification, a denial of service (DoS) attack classification, a distributed denial of service attack (DDoS) attack classification, and/or a ransomware attack classification.

Aspect 19. The computing device of any of aspects 16-18, the one or more memories having stored thereon computer executable instructions that, when executed by the one or more processors, cause the computing device to further:
receive a set of known events including event classifications; and
determine a new event classification by using an event machine learning algorithm to determine the new event classification based on the determined correlations between events.

Aspect 20. The computing device of any of aspects 16-19, the one or more memories having stored thereon computer executable instructions that, when executed by the one or more processors, cause the computing device to further:
receive a set of known events including event classifications;
detect the events by: (i) detecting the events according to the event classifications, and (ii) classifying the detected events into the event classifications; and
route data of the classified events into respective event machine learning algorithms corresponding to the classified events to (i) determine a new event classification, and/or (ii) modify an classification included in the set of known events.

Additional exemplary embodiments—Improving computer security by predicting a future event Aspect 1. A computer-implemented method for improving security in a virtual environment by predicting a future event in the virtual environment, the method comprising:
receiving, via one or more processors, a set of known events including event classifications;
receiving, via the or more processors, data of layers of the virtual environment, wherein the virtual environment is configured to allow a user to interact with a virtual world;

detecting, via the one or more processors, events in the data of the layers of the virtual environment, wherein the detecting the events in the data includes: (i) detecting the events according to the event classifications, and (ii) classifying the detected events into the event classifications; and predicting, via the one or more processors, the future event by analyzing the detected events.

Aspect 2. The computer-implemented method of aspect 1, wherein the predicted future event corresponds to a classification included in the set of known events.

Aspect 3. The computer-implemented method of any one of aspects 1-2, wherein the predicting the future event comprises analyzing the detected events by:

routing, via the one or more processors, the detected events to a trained event machine learning algorithm to predict the future event.

Aspect 4. The computer-implemented method of any one of aspects 1-3, wherein the event machine learning algorithm is trained based on data of historical events including: (i) classifications of the historical events, (ii) times the historical events occurred, and (iii) layers that the historical events occurred in.

Aspect 5. The computer-implemented method of any one of aspects 1-4, further comprising:

analyzing, via the one or more processors, the detected events to determine a new event classification; and wherein the predicted future event corresponds to the new event classification.

Aspect 6. The computer-implemented method of any of aspects 1-5, wherein the event classifications in the set of known events include: a character movement classification, a click pattern classification, a message pattern classification, an overlay classification, disorientation classification, an attack on an NFT database classification, a financial fraud classification, a privacy data violation classification, a denial of service (DoS) attack classification, a distributed denial of service attack (DDoS) attack classification, and/or a ransomware attack classification.

Aspect 7. The computer-implemented method of any one of aspects 1-6, further comprising analyzing, via the one or more processors, the predicted future event to determine a solution to the predicted future event.

Aspect 8. The computer-implemented method of any one of aspects 1-7, wherein the solution comprises: temporarily suspending a virtual environment account, permanently disabling the virtual environment account, blocking a message in the virtual environment, adding a warning label to the message in the virtual environment, triggering an audio or visual alarm, and/or alerting law enforcement.

Aspect 9. The computer-implemented method of any one of aspects 1-7, wherein:

the analyzing the predicted future event comprises routing, via the one or more processors, data of the predicted future event into a trained solution machine learning algorithm to determine the solution to the predicted future event;

the method further comprises:

presenting, via the one or more processors, the determined solution to an administrator;

receiving, via the one or more processors, and from the administrator, feedback regarding the determined solution; and routing, via the one or more processors, the feedback to the trained solution machine learning algorithm to further train the solution machine learning algorithm.

Aspect 10. The computer-implemented method of any one of aspects 1-9, further comprising:

analyzing, via the one or more processors, the predicted future event to determine a set of solutions to the predicted future event; and ranking solutions of the set of solutions.

Aspect 11. A computer system for improving security in a virtual environment by predicting a future event in the virtual environment, the computer system comprising one or more processors configured to:

receive a set of known events including event classifications;

receive data of layers of the virtual environment, wherein the virtual environment is configured to allow a user to interact with a virtual world;

detect events in the data of the layers of the virtual environment, wherein the detecting the events in the data comprises, via the one or more processors: (i) detecting the events according to the event classifications, and (ii) classifying the detected events into the event classifications; and predict the future event by analyzing the detected events.

Aspect 12. The computer system of aspect 11, wherein the predicted future event corresponds to a classification included in the set of known events.

Aspect 13. The computer system of any of aspects 11-12, wherein the one or more processors are further configured to:

analyze the detected events to determine a new event classification; and wherein the predicted future event corresponds to the new event classification.

Aspect 14. The computer system of any one of aspects 11-13, wherein the event classifications in the set of known events include: a character movement classification, a click pattern classification, a message pattern classification, an overlay classification, disorientation classification, an attack on an NFT database classification, a financial fraud classification, a privacy data violation classification, a denial of service (DoS) attack classification, a distributed denial of service attack (DDoS) attack classification, and/or a ransomware attack classification.

Aspect 15. The computer system of any one of aspects 11-14, wherein the one or more processors are further configured to analyze the predicted future event to determine a solution to the predicted future event.

Aspect 16. The computer system of any one of aspects 9-15, wherein the one or more processors are further configured to:

analyze the predicted future event to determine a set of solutions to the predicted future event; and rank solutions of the set of solutions.

Aspect 17. A computing device for improving security in a virtual environment by predicting a future event in the virtual environment, the computing device comprising:

one or more processors; and one or more memories;

the one or more memories having stored thereon computer-executable instructions that, when executed by the one or more processors, cause the computing device to:

receive a set of known events including event classifications;

receive data of layers of the virtual environment, wherein the virtual environment is configured to allow a user to interact with a virtual world;

detect events in the data of the layers of the virtual environment, wherein the detecting the events in the data comprises, via the one or more processors: (i) detecting the events according to the event classifications, and (ii) classifying the detected events into the event classifications; and
predict the future event by analyzing the detected events.

Aspect 18. The computing device of aspect 17, wherein the predicted future event corresponds to a classification included in the set of known events.

Aspect 19. The computing device of any one of aspects 17-18, the one or more memories having stored thereon computer executable instructions that, when executed by the one or more processors, cause the computing device to further:
analyze the detected events to determine a new event classification; and
wherein the predicted future event corresponds to the new event classification.

Aspect 20. The computing device of any one of aspects 17-19, wherein the event classifications in the set of known events include: a character movement classification, a click pattern classification, a message pattern classification, an overlay classification, disorientation classification, an attack on an NFT database classification, a financial fraud classification, a privacy data violation classification, a denial of service (DoS) attack classification, a distributed denial of service attack (DDoS) attack classification, and/or a ransomware attack classification.

Other Matters

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for improving security in a virtual environment by determining correlations between events in the virtual environment, the method comprising:
receiving, via one or more processors, data of layers of the virtual environment, wherein the virtual environment is configured to allow a user to interact with a virtual world;
receiving, via the one or more processors, a set of known events including event classifications, wherein the set of known events indicate a plurality of security threats;

detecting, via the one or more processors, events in the data of the layers of the virtual environment; and determining, via the one or more processors, correlations between the events in the data of the layers of the virtual environment, wherein at least one correlation of the determined correlations is between events of different layers in the virtual environment; and wherein the layers of the virtual environment comprise:
an experience layer;
a discovery layer;
a creator economy layer;
a spatial computing layer;
a decentralization layer;
a human interface layer;
an infrastructure layer;
an authentication, authorization and integration layer; and/or an identity, and access management layer; and wherein the method further comprises:
predicting, via the one or more processors, a future event by analyzing the detected events; and
analyzing, via the one or more processors and using a solution machine learning algorithm, the predicted future event to determine a solution to the predicted future event, wherein the solution comprises: temporarily suspending a virtual environment account, permanently disabling the virtual environment account, blocking a message in the virtual environment, adding a warning label to the message in the virtual environment, triggering an audio or visual alarm, and/or alerting law enforcement; and wherein the determined solution is implemented based on a detected event.

2. The computer-implemented method of claim 1,
wherein the detecting the events in the data comprises, via the one or more processors, classifying the detected events into the event classifications; and
wherein the at least one correlation between events of different layers is determined by correlating events according to the classifications.

3. The computer-implemented method of claim 2, wherein the event classifications in the set of known events include: a character movement classification, a click pattern classification, a message pattern classification, an overlay classification, disorientation classification, an attack on an NFT database classification, a financial fraud classification, a privacy data violation classification, a denial of service (DOS) attack classification, a distributed denial of service attack (DDOS) attack classification, and/or a ransomware attack classification.

4. The computer-implemented method of claim 1, wherein the method further comprises analyzing, via the one or more processors, the data of the layers of the virtual environment to determine a new classification of an event, wherein the new classification is not in the set of known events, and wherein the new event classification determination is based on the determined correlations between events; and wherein the new event classification is determined by using an event machine learning algorithm to determine the new event classification based on the determined correlations between events.

5. The computer-implemented method of claim 1, wherein the method further comprises analyzing, via the one or more processors, the data of the layers of the virtual environment to determine a new classification of an event, wherein the new classification is not in the set of known events, and wherein the new event classification determination is based on the determined correlations between events; and wherein the detecting the events in the data comprises, via the one or more processors, classifying the detected events into the event classifications; and wherein the method further comprises routing, via the one or more processors, data of the classified events into respective event machine learning algorithms corresponding to the classified events to: (i) determine the new event classification, and/or (ii) modify a classification included in the set of known events.

6. The computer-implemented method of claim 1, further comprising:
storing, via the one or more processors, the determined correlations, wherein each correlation is stored along with: (i) event types of each of the correlated events, (ii) time stamps of each of the correlated events, and (iii) indications of layers that each of the correlated events occurred in.

7. The computer-implemented method of claim 1, further comprising storing, via the one or more processors, data of the detected events including times of the detected events on a distributed ledger.

8. The computer-implemented method of claim 1, further comprising building, via the one or more processors, a graph database including: (i) entity nodes corresponding to the detected events, and (ii) edges between the entity nodes corresponding to correlations between events.

9. A computer system for improving security in a virtual environment by determining correlations between events in the virtual environment, the computer system comprising one or more hardware processors configured to:
receive data of layers of the virtual environment, wherein the virtual environment is configured to allow a user to interact with a virtual world;
receive a set of known events including event classifications, wherein the set of known events indicate a plurality of security threats;
detect events in the data of the layers of the virtual environment; and
determine correlations between the events in the data of the layers of the virtual environment, wherein at least one correlation of the determined correlations is between events of different layers in the virtual environment; and wherein the layers of the virtual environment comprise:
an experience layer;
a discovery layer;
a creator economy layer;
a spatial computing layer;
a decentralization layer;
a human interface layer;
an infrastructure layer;
an authentication, authorization and integration layer; and/or an identity, and access management layer; and wherein the one or more hardware processors are further configured to:
predict a future event by analyzing the detected events;
analyze, using a solution machine learning algorithm, the predicted future event to determine a solution to the predicted future event, wherein the solution comprises: temporarily suspending a virtual environment account, permanently disabling the virtual environment account, blocking a message in the virtual environment, adding a warning label to the message in the virtual environment, triggering an audio or visual alarm, and/or alerting law enforcement; and implement the determined solution based on a detected event.

10. The system of claim 9, wherein the one or more hardware processors are further configured to:

detect the events by classifying the detected events into the event classifications; and determine the at least one correlation between events of different layers by correlating events according to the classifications.

11. The system of claim 10, wherein the event classifications in the set of known events include: a character movement classification, a click pattern classification, a message pattern classification, an overlay classification, disorientation classification, an attack on an NFT database classification, a financial fraud classification, a privacy data violation classification, a denial of service (DOS) attack classification, a distributed denial of service attack (DDOS) attack classification, and/or a ransomware attack classification.

12. The system of claim 9, wherein the one or more hardware processors are further configured to:

determine a new event classification based on the determined correlations between events, wherein the new event classification is not in the set of known events;

detect the events by classifying the detected events into the event classifications; and route data of the classified events into respective event machine learning algorithms corresponding to the classified events to: (i) determine the new event classification, and/or (ii) modify a classification included in the set of known events.

13. A computing device for improving security in a virtual environment by determining correlations between events in the virtual environment, the computing device comprising:

one or more processors; and one or more non-transitory memories;

the one or more non-transitory memories having stored thereon computer-executable instructions that, when executed by the one or more processors, cause the computing device to:

receive data of layers of the virtual environment, wherein the virtual environment is configured to allow a user to interact with a virtual world;

receive a set of known events including event classifications, wherein the set of known events indicate a plurality of security threats;

detect events in the data of the layers of the virtual environment; and determine correlations between the events in the data of the layers of the virtual environment, wherein at least one correlation of the determined correlations is between events of different layers in the virtual environment; and wherein the layers of the virtual environment comprise:

an experience layer;

a discovery layer;

a creator economy layer;

a spatial computing layer;

a decentralization layer;

a human interface layer;

an infrastructure layer;

an authentication, authorization and integration layer; and/or an identity, and access management layer; and wherein the one or more non-transitory memories having stored thereon computer executable instructions that, when executed by the one or more processors, cause the computing device to:

predict a future event by analyzing the detected events;

analyze, using a solution machine learning algorithm, the predicted future event to determine a solution to the predicted future event, wherein the solution comprises: temporarily suspending a virtual environment account, permanently disabling the virtual environment account, blocking a message in the virtual environment, adding a warning label to the message in the virtual environment, triggering an audio or visual alarm, and/or alerting law enforcement; and implement the determined solution based on a detected event.

14. The computing device of claim 13, the one or more non-transitory memories having stored thereon computer executable instructions that, when executed by the one or more processors, cause the computing device to further:

detect the events by classifying the detected events into the event classifications; and determine the at least one correlation between events of different layers by correlating events according to the classifications.

15. The computing device of claim 14, wherein the event classifications in the set of known events include: a character movement classification, a click pattern classification, a message pattern classification, an overlay classification, disorientation classification, an attack on an NFT database classification, a financial fraud classification, a privacy data violation classification, a denial of service (DOS) attack classification, a distributed denial of service attack (DDOS) attack classification, and/or a ransomware attack classification.

16. The computing device of claim 13, the one or more memories having stored thereon computer executable instructions that, when executed by the one or more processors, cause the computing device to further:

determine a new event classification based on the determined correlations between events, wherein the new event classification is not in the set of known events;

detect the events by classifying the detected events into the event classifications; and route data of the classified events into respective event machine learning algorithms corresponding to the classified events to: (i) determine the new event classification, and/or (ii) modify a classification included in the set of known events.

* * * * *

UNITED STATES PATENT AND TRADEMARK OFFICE
CERTIFICATE OF CORRECTION

PATENT NO. : 12,113,819 B2
APPLICATION NO. : 18/078722
DATED : October 8, 2024
INVENTOR(S) : Sastry Vsm Durvasula et al.

Page 1 of 1

It is certified that error appears in the above-identified patent and that said Letters Patent is hereby corrected as shown below:

In the Claims

At Column 23, Line 18, "an identity, and access management layer; and" should be at Line 19, as a new sub-point.

At Column 23, Line 48, "(DOS)" should be -- (DoS) --.

At Column 23, Line 49, "(DDOS)" should be -- (DDoS) --.

At Column 24, Line 57, "an identity, and access management layer; and" should be at Line 58, as a new sub-point.

At Column 25, Line 19, "(DOS)" should be -- (DoS) --.

At Column 25, Line 20, "(DDOS)" should be -- (DDoS) --.

At Column 26, Line 7, "an identity, and access management layer; and" should be at Line 8, as a new sub-point.

At Column 26, Line 40, "(DOS)" should be -- (DoS) --.

At Column 26, Line 41, "(DDOS)" should be -- (DDoS) --.

Signed and Sealed this
Second Day of September, 2025

Coke Morgan Stewart
*Acting Director of the United States Patent and Trademark Office*